J. LILLEY.
Fiber Brake.
No. 12,025.
Patented Dec. 5, 1854.
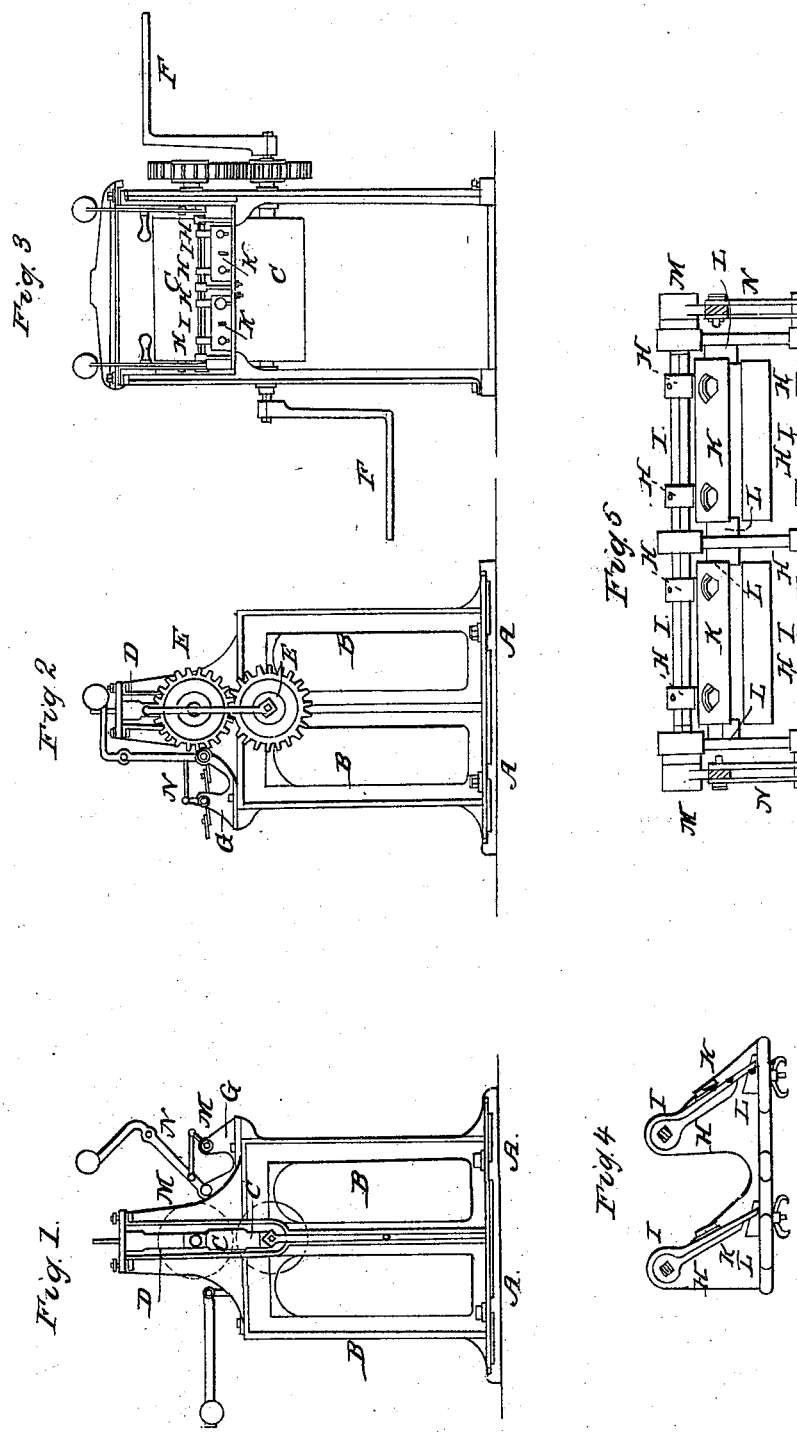

UNITED STATES PATENT OFFICE.

JOHN LILLEY, OF BIRKENHEAD, COUNTY OF CHESTER, ENGLAND.

IMPROVEMENT IN MACHINERY FOR SEPARATING THE FIBER FROM THE WOODY PORTION OF TROPICAL PLANTS.

Specification forming part of Letters Patent No. 12,025, dated December 5, 1854.

*To all whom it may concern:*

Be it known that I, JOHN LILLEY, of Birkenhead, in the county of Chester and Kingdom of England, a subject of the Queen of Great Britain, have invented, made, and applied to use an invention for separating the refuse vegetable matter contained in the stalk and leaves of the plantain species, and also of trees grown in tropical climates, from the fibrous material of the same, in order that the latter may be manufactured into ropes or cordage, and for any other such purposes for which the material may be suitable; and I do hereby declare that the following specification, taken in connection with the accompanying drawings, forms a full and exact description of my said invention, for which Letters Patent were granted to me by Her Most Gracious Majesty Queen Victoria on the 21st day of July, in the year of our Lord 1853.

In the accompanying drawings, Figure 1 is a side elevation of the machine, having a base-plate, A, on which are fixed two frames, B, (see also Figs. 2 and 3,) in which frames B are suitable bearings, O, for the reception of the rollers C. The bearings for the top roller, C, are made to move freely in the grooves D, to allow the top roller to rise or fall when necessary. These rollers are connected at one end by means of the wheels E, to make them revolve simultaneously They are moved by means of the handles F F. They may also be driven by steam or other power, the connection being made where the handles are fixed by means of wheels, pulleys, or in any other suitable manner.

On the front of the frames B there is a plate, G, fixed, having thereon brackets to receive the spindles, Figs. 3, 4, and 5, on which spindles are fixed the levers H, to which levers are attached the knives or scrapers K, which are made of steel or other suitable material. On the bottom of the frame G, underneath the knives or scrapers, I cover with vulcanized india-rubber or other suitable material. I also at the end of each knife or scraper have wedges L, for the knives or scrapers to set on or against as a counteracting power, so as to keep always the regular distance between the knives and scrapers and the india-rubber, so as to prevent the destruction of the fibrous substance. The wedges L are movable on the frame G by means of the screws P, Fig. 4. On the outer edge of the spindle I are two levers, M, which are connected together by means of the links N. On the inner lever is a weight to keep them in the position shown in Fig. 2, where the knives or scrapers are shown in the position ready for the introduction of the stalk or leaf. After it has been entered and the rollers turned a little, the knives or scrapers are brought to the position shown in Figs. 1, 3, and 4, and by turning the rollers the stalk or leaf, which has been previously prepared for the operation, is drawn through them and under the knives or scrapers, which are operated by means of cams *a*, Fig. 3, on the inside of one of the wheels E, and the refuse vegetable matter separated from the fiber. On the opposite side of the rollers to the frame G, I fix two scrapers, also, for the purpose of keeping the rollers clean. I also propose to use, if necessary, a comb made of steel, brass, or other suitable material, attached to where the inner knife or scraper is fixed for the purpose of finely dividing the fiber after the refuse vegetable matter has been taken away.

Having thus fully described the nature of my invention, what I claim therein as new, and desire to secure by Letters Patent, is—

The combination of the yielding knives or scrapers with the rollers, when said knives or scrapers are hung on a toggle-joint, and operated by the cams *a*, and thrown out of or into action with said cams by weighted levers, first to receive the material, and then to divest it of the refuse matter, substantially as herein described.

In testimony that the foregoing is a true description of my invention I hereunto subscribe my name in presence of two witnesses.

JOHN LILLEY.

Witnesses:
   CHAS. F. STANSBURY,
   G. W. YAPP.